United States Patent
Indyk et al.

(10) Patent No.: US 11,891,465 B2
(45) Date of Patent: Feb. 6, 2024

(54) SYSTEM FOR OBTAINING A PHOTOPOLYMERIZED PREPOLYMER

(71) Applicant: Mighty Buildings, Inc., San Francisco, CA (US)

(72) Inventors: Denis Indyk, Tomsk (RU); Aleksandr Trushin, Tomsk (RU); Anna Trushina, Tomsk (RU); Aleksei Dubov, Moscow (RU); Dmitry Starodubtsev, Tomsk (RU); Slava Solonitsyn, Singapore (SG)

(73) Assignee: Mighty Buildings, Inc., Oakland, CA (US)

( * ) Notice: Subject to any disclaimer, the term of this patent is extended or adjusted under 35 U.S.C. 154(b) by 329 days.

(21) Appl. No.: 17/017,669

(22) Filed: Sep. 10, 2020

(65) Prior Publication Data
US 2020/0407472 A1 Dec. 31, 2020

Related U.S. Application Data

(63) Continuation-in-part of application No. 16/397,655, filed on Apr. 29, 2019, now Pat. No. 11,667,080.

(51) Int. Cl.
*C08F 22/20* (2006.01)
*E04B 1/35* (2006.01)
(Continued)

(52) U.S. Cl.
CPC .............. *C08F 22/20* (2013.01); *B29B 13/10* (2013.01); *B29C 64/314* (2017.08); *B33Y 40/10* (2020.01);
(Continued)

(58) Field of Classification Search
None
See application file for complete search history.

(56) References Cited

U.S. PATENT DOCUMENTS

| 4,150,169 A | 4/1979 | Bagley |
| 4,544,626 A | 10/1985 | Sullivan |

(Continued)

FOREIGN PATENT DOCUMENTS

| WO | 2015/105762 A1 | 7/2015 |
| WO | 2016/025579 A1 | 2/2016 |
| WO | 2020/120986 A1 | 6/2020 |

OTHER PUBLICATIONS

International Search Report in PCT International Application No. PCT/US2021/049328, dated Feb. 3, 2022.
(Continued)

*Primary Examiner* — Jacob T Minskey
*Assistant Examiner* — Adrien J Bernard
(74) *Attorney, Agent, or Firm* — Cognition IP, P.C.; Edward Steakley; Justin White

(57) ABSTRACT

A photopolymerized prepolymer manufacturing system can create material suitable for 3D printing buildings or building components. The system can include a conveyor, a prepolymerization chamber, and one or more processors. The prepolymerization chamber can have multiple prepolymerization stations arranged in sequence and can convert untreated material into photopolymerized prepolymer material as the conveyor moves the prepolymer past the prepolymerization chamber. The processor(s) can control operations of the conveyor, the prepolymerization chamber, or both, to alter operations in response to a detected system event. Each polymerization station can include a light source, such as an LED array, that irradiates material. Each light source can be in a lid of the prepolymerization station. When operation of one polymerization station is halted, such as for maintenance, then the system can increase the light source intensity of the remaining polymerization stations, slow the conveyor speed, or both.

22 Claims, 10 Drawing Sheets

(51) Int. Cl.
  *E04B 1/16* (2006.01)
  *B33Y 70/00* (2020.01)
  *B29B 13/10* (2006.01)
  *B29C 64/314* (2017.01)
  *B33Y 40/10* (2020.01)

(52) U.S. Cl.
  CPC ............... *B33Y 70/00* (2014.12); *E04B 1/16* (2013.01); *E04B 1/3505* (2013.01)

(56) References Cited

U.S. PATENT DOCUMENTS

| | | | |
|---|---|---|---|
| 6,174,070 B1 | 1/2001 | Takamura et al. | |
| 6,207,118 B1 * | 3/2001 | Gaven | B29C 35/08 422/186.3 |
| 6,436,532 B1 * | 8/2002 | Moon | C08F 2/48 522/4 |
| 6,683,421 B1 * | 1/2004 | Kennedy | B29C 35/0288 362/555 |
| 6,927,018 B2 | 8/2005 | Burgess | |
| 9,394,441 B2 | 7/2016 | Xu et al. | |
| 2012/0211155 A1 | 8/2012 | Wehning et al. | |
| 2015/0224680 A1 * | 8/2015 | Oestergaard | B41F 23/0453 425/150 |
| 2015/0273520 A1 | 10/2015 | Okamoto | |
| 2016/0214327 A1 * | 7/2016 | Uckelmann | B29C 67/0007 |
| 2016/0361704 A1 | 12/2016 | Won et al. | |
| 2018/0056587 A1 * | 3/2018 | Arai | B29C 64/364 |
| 2018/0281236 A1 | 10/2018 | Elgar et al. | |
| 2020/0407472 A1 | 12/2020 | Indyk et al. | |

OTHER PUBLICATIONS

"Prepolymer" (Wikipedia) Dec. 21, 2016 (Dec. 21, 2016) retrieved from <https://en.wikipedia.org/w/index.php?title=Prepolymer&oldid=755943875> entirety of document.

International Search Report in International Application No. PCT/US2020/030553, dated Aug. 4, 2020.

* cited by examiner

SYSTEM FOR OBTAINING A PHOTOPOLYMERIZED PREPOLYMER

CROSS-REFERENCE TO RELATED APPLICATION

This application is a continuation-in-part of and claims priority to U.S. patent application Ser. No. 16/397,655, titled "SYSTEM FOR OBTAINING A PHOTOPOLYMERIZED PREPOLYMER," filed Apr. 29, 2019, which application is hereby incorporated by reference in its entirety.

TECHNICAL FIELD

The present disclosure relates generally to prepolymers, and more particularly to the creation of photopolymerized prepolymers suitable for use as construction materials.

BACKGROUND

Over the past decade, three-dimensional ("3D") printing has become a big buzz term in the industry and starts penetrating even into such a field as the construction sector. With 3D printers now capable of printing building walls and processing cements, the technology could help reshape the traditional construction technique and products. The history of 3D printing in construction is not yet rich. In 2004, a University of South Carolina made an attempt to produce a wall by 3D printing which was widely accepted as the technology's first entry into construction. In 2014, a full canal house built using 3D printing was completed in Amsterdam. In 2016, a 3D-printed mansion was completed in China. Also in 2016, the Dubai Future Foundation built its office via 3D printing which is considered as a major milestone for the technology in the commercial construction sector. The fully functioning 2,700-square foot building was built in just 17 days by a large 3D printer that measured 120×40×20 feet.

The benefits of 3D printing in construction are the following: speed, waste reduction, design freedom, and reduced human errors. The challenges of 3D printing in construction are high cost, labor shortage, quality control, and a lack of appropriate regulations. Nevertheless, the use of 3D printing in construction has already been mentioned in patent literature, including polymerization systems, which cure a starting polymerizable material by photopolymerization.

Thus, U.S. Pat. No. 9,394,441 issued on Jul. 19, 2016 to P. Xu, et al. discloses a build material for use in a three-dimensional printing system. The material consists of a curable oligomeric material, a reactive component, a non-reactive component comprising one or more urethane waxes, and at least one diluent. The reactive component of the material is at least one chemical moiety that is polymerizable with a chemical moiety contained in the oligomeric curable material and/or at least one diluent. The reactive component is present in the build material as crystalline regions.

Although U.S. Pat. No. 9,394,441 does not explicitly teach curing of the polymerizable material by photopolymerization, one can assume that such a curing method is provided. It is stated that in some embodiments, suitable photoinitiators comprise those operable for use with a HeCd laser radiation source, including acetophenones, conveniently 2,2-dialkoxybenzophenones and 1-hydroxyphenyl ketones, for example 1-hydroxycyclohexyl phenyl ketone or 2-hydroxyisopropyl phenyl ketone (=2-hydroxy-2,2-dimethylacetophenone).

Additionally, in some embodiments, suitable photoinitiators comprise those operable for use with an Ar laser radiation source including benzyl ketals, such as benzyl dimethyl ketal. In some embodiments, a photoinitiator comprises an α-hydroxyphenyl ketone, benzyl dimethyl ketal or 2,4,6-trimethylbenzoyl diphenylphosphine oxide or a mixture thereof.

U.S. Pat. No. 6,927,018 issued on Aug. 9, 2005 to R. Burgess relates to three-dimensional printing using photo-activated building materials. The publication discloses a method, an article of manufacture, and a system for fabricating an article using photo-activatable building material. The method includes the steps of applying a layer of a photo-activatable building material to a preselected surface, scanning the layer using a plurality of light-emitting centers to photo-activate the layer of photo-activatable building material in accordance with a predetermined photo-initiation process to obtain polymerization of the building material, wherein scanning is accomplished at a predetermined distance using a predetermined light intensity, and repeating the steps of applying the layer, with each layer being applied to an immediately previous layer, and scanning the layer with the plurality of light-emitting centers to polymerize the building material until the article is fabricated. Photo-activatable building materials exemplified herein as materials suitable for the manufacture of building components in the proposed 3D printing method are the Shipley Microposit S1800 Series Photo Resists. The Shipley Microposit S1800 Series Photo Resists are optimized for G-line (0.436 microns) exposure, effective for broadband exposure, and have high-resolution process parameters. For example, Shipley Microposit S1813 has a 12.3 micrometer thickness, requires 150 mJ/cm$^2$ for polymerization ("printing"), and may be polymerized at the G-line (0.54 NA).

Although previous ways of forming organic polymers have worked well in the past, improvements are always helpful. In particular, what is desired are improved systems and methods for forming photopolymerized prepolymers suitable for use in the 3D printing of construction components.

SUMMARY

The present disclosure relates to systems and methods for obtaining photopolymerized prepolymers as materials suitable for manufacturing buildings or building components using 3D printing processes. Such building components can include walls, floors, exterior and interior cladding, furniture, other outdoor and indoor features, and the like. This can be accomplished using a system that includes a closed loop conveyor, such as a flexible belt, stretched between a precursor loading station and a prepolymerization material receiver from which the product is unloaded to a mixer for the inorganic fillers to be added and then to the construction 3D printing machine. The conveyor can carry a plurality of flexible trays that loop around pulleys of the closed loop conveyor. One pulley can be a driving pulley having a driving motor. The trays are shallow troughs that have open tops and carry dosed portions of the precursor, which is photopolymerized on its way from the loading station to the unloading station by sequentially passing under light sources of two photopolymerization stations.

The conveyor can have a loading station for untreated (i.e., precursor) material and unloading position on the side opposite to the loading station. Trays can receive material facing upward at the loading station, pass through the unloading station, and then return face down back to the loading station on the underside of the conveyor. Photopolymerization stations can include a plurality of light-emitting devices operating at predetermined wavelength(s) and irradiating the material in the trays with a predetermined dosed amount of light energy to precure the material to a desired viscosity. Parameters of the process, such as viscosity, radiation dose, exposure time, exposure intensity, temperature, and the like, can be automatically controlled by a central processing unit. Prior to unloading, uncured liquid can be separated from the precured prepolymer and is returned to the loading station for reuse.

In various embodiments of the present disclosure, a photopolymerized prepolymer manufacturing system can include at least a conveyor, a prepolymerization chamber, and one or more processors. The conveyor can be configured to move untreated material from a loading area to an unloading area. The prepolymerization chamber can be positioned proximate the conveyor and can have multiple prepolymerization stations arranged in sequence with respect to the conveyor. The prepolymerization chamber can convert at least a portion of the untreated material into photopolymerized prepolymer material as the conveyor moves the untreated material past the prepolymerization chamber. The processor(s) can be configured to control operations of the conveyor, the prepolymerization chamber, or both, and can alter operations of the conveyor, the prepolymerization chamber, or both, in response to a detected system event.

In various detailed embodiments, the photopolymerized prepolymer material (after adding the inorganic fillers) can be suitable for use in the 3D printing of buildings or building components. Each of the multiple prepolymerization stations can include one or more light sources that irradiate the untreated material as the conveyor moves the untreated material past the prepolymerization chamber. Each of the multiple prepolymerization stations further includes a lid that facilitates access to the one or more light sources, and the light sources can be contained within the lid. Some or all of the light sources can include an array of light-emitting diodes ("LEDs"). In various embodiments, the detected system event can involve a halted operation of one of the multiple prepolymerization stations. The processor(s) can be configured to increase the intensity of the one or more light sources in the remaining prepolymerization stations in response to the halted operation of one of the multiple prepolymerization stations. Each of the multiple prepolymerization stations can also include at least one fan and one or more ventilation holes to facilitate air circulation as the conveyor moves the untreated material past the prepolymerization chamber.

In various further embodiments of the present disclosure, a prepolymerization chamber configured to convert material into photopolymerized prepolymer material can include a first prepolymerization station and a second prepolymerization station. The first prepolymerization station can include a first light source configured to irradiate material at a first intensity level as a separate conveyor moves the prepolymer material past the first prepolymerization chamber, and the second prepolymerization station can include a second light source configured to irradiate the material at a second intensity level as the separate conveyor moves the material past the second prepolymerization chamber. The prepolymerization chamber can be configured to automatically increase the first intensity level when operation of the second prepolymerization station is halted, and can also be configured to automatically increase the second intensity level when operation of the first prepolymerization station is halted.

In various detailed embodiments, the prepolymerization chamber can also include a first lid at the first prepolymerization station that facilitates access to the first light source and a second lid at the second prepolymerization station that facilitates access to the second light source. The first light source can be contained within the first lid and the second light source can be contained within the second lid, and both light sources can include an array of LEDs. The prepolymerization chamber can also include a processor configured to automatically increase the first intensity level when operation of the second prepolymerization station is halted and to automatically increase the second intensity level when operation of the first prepolymerization station is halted. The processor may also be configured to interface with a separate processor controlling the separate conveyor, which can involve providing an instruction to the separate processor to slow the separate conveyor when operation of the first prepolymerization station is halted or operation of the second prepolymerization station is halted. Such halted operation of one of the first or second prepolymerization stations while the other prepolymerization station continues operation can include performing maintenance on the halted prepolymerization station. The prepolymerization chamber can also include a first fan at the first prepolymerization station, a second fan at the second prepolymerization station, and a plurality of ventilation holes at the first and second prepolymerization stations. The fans and ventilation holes can facilitate air circulation as the separate conveyor moves the material past the prepolymerization chamber.

In still further embodiments of the present disclosure, various methods of obtaining a photopolymerized prepolymer material are provided. Pertinent method steps can include introducing an uncured liquid material onto a conveyor at a loading position, moving the conveyor until the material is at a first prepolymerization station of an overall prepolymerization chamber, exposing the material to a first dose of radiation at the first prepolymerization station, moving the conveyor until the material is at a second prepolymerization station of the overall prepolymerization chamber, and exposing the material to a second dose of radiation at the second prepolymerization station. The second dose of radiation can result in curing at least a portion of the material into a photopolymerized prepolymer material. Additional method steps can include separating the cured portion of photopolymerized prepolymer material from remaining uncured liquid material, returning the remaining uncured liquid material to the loading position of the conveyor, feeding the cured portion of photopolymerized prepolymer material through a shredder, and delivering the shredded photopolymerized prepolymer to a receiver.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed features, apparatuses, systems and methods for obtaining photopolymerized prepolymers. These drawings in no way limit any changes in form and detail that may be made to the disclosure by one skilled in the art without departing from the spirit and scope of the disclosure.

DETAILED DESCRIPTION

Figure 1:
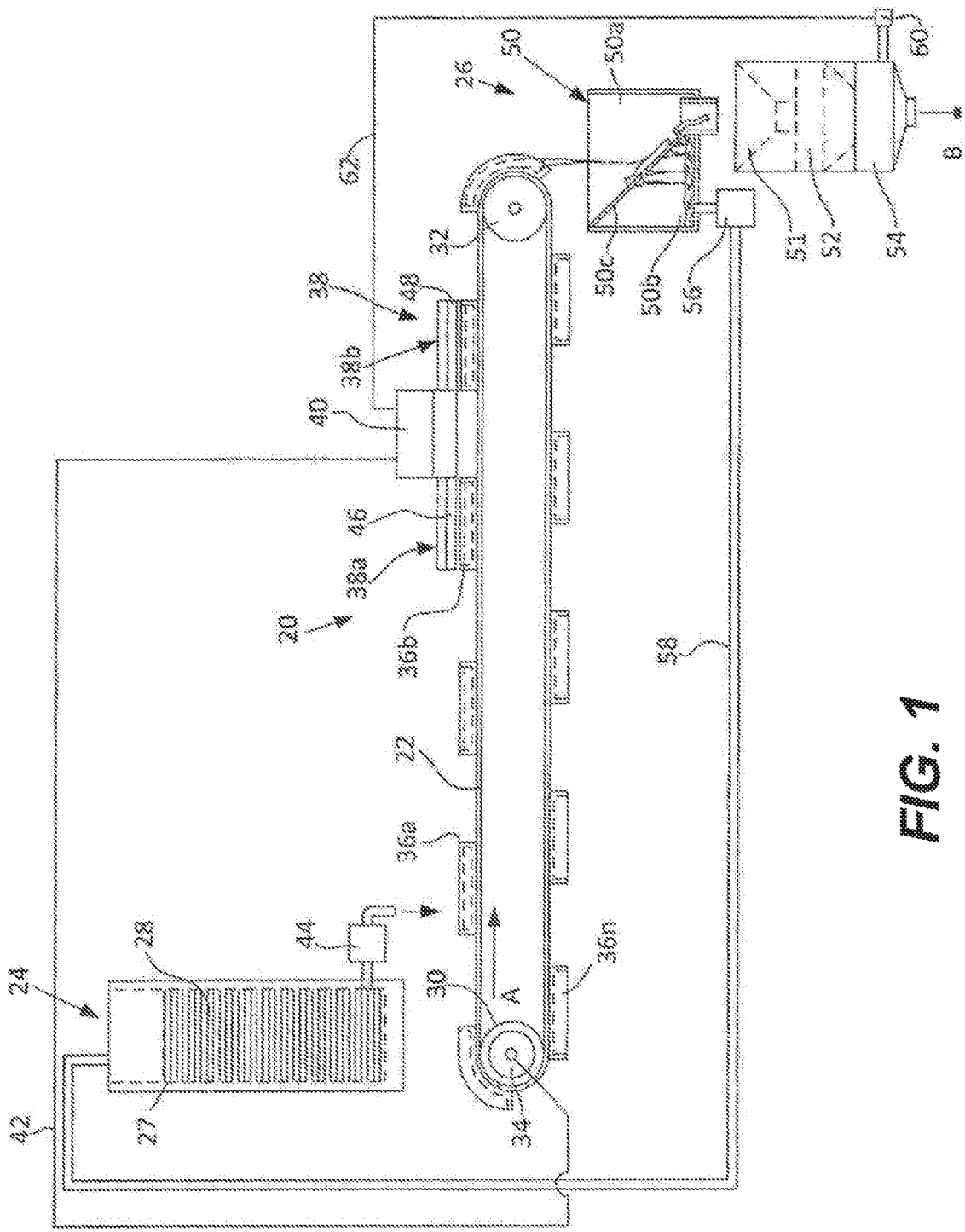
FIG. 1 illustrates in side elevation view a schematic for an example system for obtaining a photopolymerized prepolymer according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for obtaining photopolymerized prepolymers. In particular, the disclosed embodiments can be used to obtain photopolymerized prepolymers that are suitable for use (after adding inorganic fillers) as 3D printing material in the 3D printing of buildings and building components such as walls, floors, exterior and interior cladding, furniture, other outdoor and indoor features, and the like. The disclosed systems can include a conveyor, a prepolymerization chamber, and one or more processors for this purpose.

The prepolymerization chamber can have multiple prepolymerization stations arranged in sequence to convert untreated material into photopolymerized prepolymer material as the conveyor moves the prepolymer past the prepolymerization chamber. Each polymerization station can include a light source that irradiates material, and each light source can be in a lid of the prepolymerization station. When operation of one polymerization station is halted, then the system processor(s) can increase the light source intensity of the remaining polymerization stations, slow the conveyor speed, or both.

Although various embodiments disclosed herein discuss a specific formulation of material and specific light arrangements for curing the material, it will be readily appreciated that the disclosed features, apparatuses, systems, and methods can similarly be used for other formulations of materials and other curing arrangements to result in a cured material that is suitable for the 3D printing of building and building components. For example, the disclosed features and embodiments can be used with other forms of light at different wavelengths, and other arrangements of prepolymerization stations can be used, such as one, three, or more stations. Other applications, arrangements, and extrapolations beyond the illustrated embodiments are also contemplated.

Overall System

Referring first to FIG. 1, a schematic of an example system for obtaining a photopolymerized prepolymer ("system") is illustrated in side elevation view. System 20 is intended for the preparation of a photopolymerized organic material for use in a mixture with other components in the manufacture of buildings or building parts by 3D printing. The system 20 is intended for providing a continuous and effective prepolymerization of photocurable photopolymerizable material by irradiating the prepolymerizable material under the effect of light emitted from light sources installed on the way of the photopolymerizable material, which is transported from a starting material loader to the prepolymerized material output station.

More specifically, as shown in FIG. 1, the system 20 contains a transporting unit in the form of a closed loop conveyor 22, e.g., a flexible belt that extends from a loading position, i.e., a prepolymerizable material input station 24, to an unloading position on the side opposite to the loading position, i.e., a prepolymerized material output station 26. The input station is provided with a tank 27, which contains a starting photo-prepolymerizable material 28 in a liquid state and a solid PEG 4000 powder (in some formulations) suspended in the liquid media.

The closed loop conveyor 22, i.e., a flexible belt, is guided around pulleys 30 and 32, one of which, e.g., the pulley 30, is a driving pulley and another, i.e., the pulley 32, is a driven pulley. The pulley 30 is driven into rotation by a motor 34 via a driver (not shown). The upper run of the conveyor 22 moves in the direction of arrow A (FIG. 1). Attached to the surface of the conveyor 22 is a plurality of prepolymerization trays (hereinafter referred to as "material-receiving trays") 36a, 36b, ... 36n (FIG. 1). The trays may be spaced from one another at a predetermined distance or may be connected to each other as links of a tractor tracks.

Figure 2:
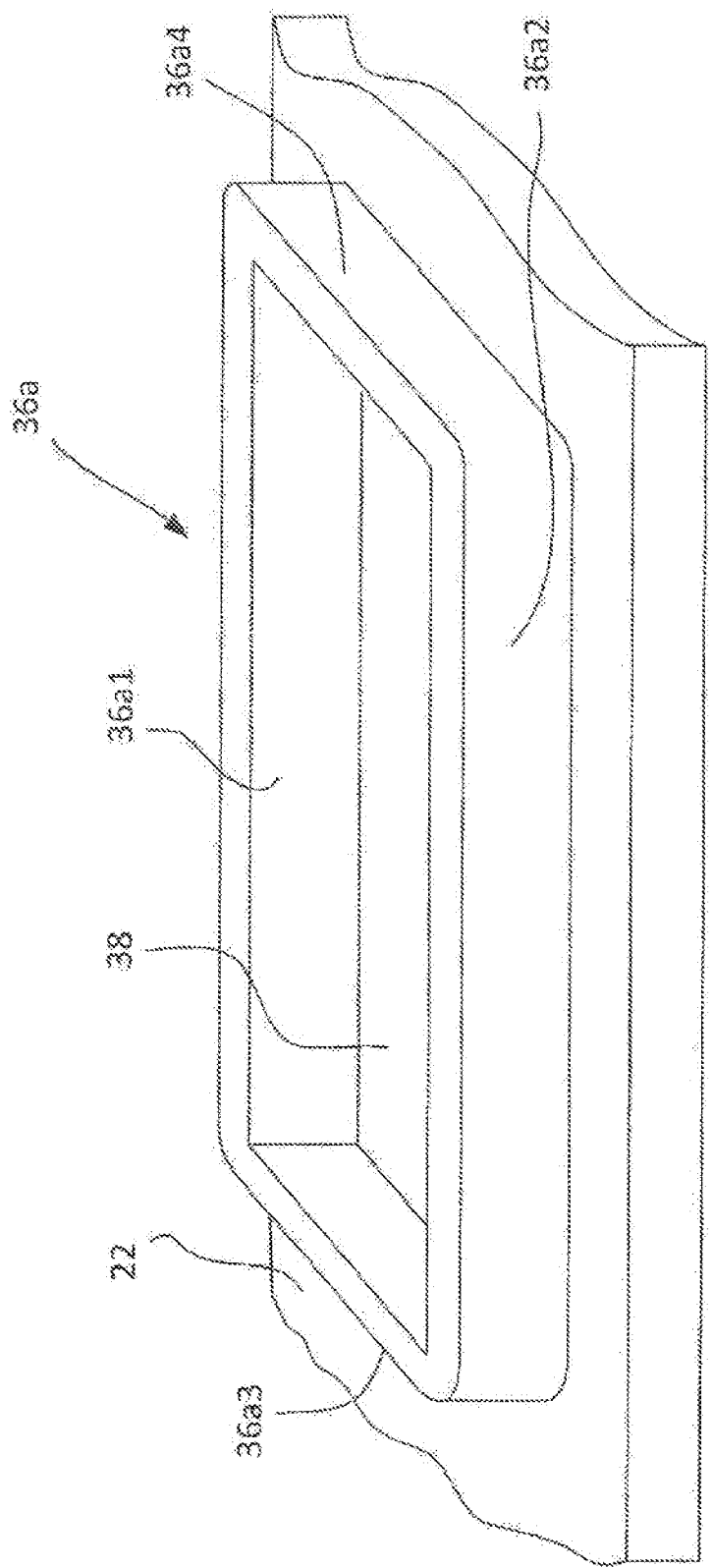
FIG. 2 illustrates in front perspective view an example tray for use on a conveyor of the system of FIG. 1 according to one embodiment of the present disclosure.

Continuing with FIG. 2, an example tray for use on a conveyor of the system of FIG. 1 is shown in front perspective view. Tray 36a can be a shallow rectangular trough, which has an open top, side walls 36a1, 36a2, 36a3, and 36a4 and a bottom plate 38. It is understood that the material-receiving tray is shown as a rectangular body only as an example and that the tray may be square, hexagonal, or of any other suitable shape. Since the trays 36a, 36b, . . . 36n are secured to the conveyor 22, i.e., the belt, and should pass around the pulleys 34 and 36, they are made of a flexible material, e.g., silicone, which is chemically inert to the liquid photopolymerizable material 28 and is able to loop around the pulleys. To increase the efficiency of curing of the photopolymerizable material, the inner surfaces of the side walls 36a1, 36a2, 36a3, and 36a4 and the bottom plate 38 can be coated with a reflective coating.

In other words, the conveyor 22 has a loading position on the side of the untreated material loading station and unloading position on the side opposite to the loading position, wherein, when the material-receiving trays pass through the unloading position, the material receiving trays are turned into upside-down positions, i.e., into position in which the open tops of the trays face down.

System 20 can include a stationary prepolymerization chamber 38 that may have a first prepolymerization station 38a and a second prepolymerization station 38b arranged in sequence above the conveyor 22 for passing through them the material-receiving trays 36a, 36b, . . . 36n on the way from the loading material input station 24 to the prepolymerized material output station 26. The material-receiving trays 36a, 36b, . . . 36n pass through the prepolymerization stations 38a and 38b in a continuous or an intermittent manner under control of a central processing unit 40 that, among other things, controls the operation speed of the drive motor 34 of the drive pulley 30 via a feedback line 42.

Two prepolymerization stations 38a and 38b can be used rather than just one in order not to interrupt the process. If one of the stations fails, the other continues to work, and the process is not interrupted. In various embodiments, dividing the photo-prepolymerization process into two or more stages can allow for finer selection of the viscosity in the final product, since a photopolymerization kinetics curve can have an exponential form. During the normal operation of both stations, their light energy doses can be shared as 50%/50%. If only one station operates, the load on it increases. Furthermore, the use of two-stage prepolymerization provides better control of the prepolymerization process and makes it possible to improve the quality of the product obtained. Further abilities and features of prepolymerization chamber 38 and its various components are provided in greater detail below in FIGS. 3 through 8B and the related descriptions thereof.

The photopolymerizable material that fills the material-receiving trays 36a, 36b, . . . 36n is supplied to these trays from the input station tank 37 via a dosing valve 44. The material contained in the trays is prepolymerized by photopolymerization under the effect of light emitted from light sources 46 and 48 installed in the respective stations 38a and 38b just above the path of the material-receiving trays 36a, 36b, . . . 36n. Each light source 46 and 48 can include multiple LEDs, for example.

The light sources 46 and 48 of both stations 38a and 38b can provide a total light illumination power in the range of 2 to 50 Wt, for example. According to one specific embodiment of the invention, in each station, the LEDs are arranged in the form of a flat matrix of a rectangular or square-shaped configuration. The LEDs may operate on various lengths, such as 405 nm, 440 nm, etc. The main requirement to the light sources 46 and 48 is to provide high uniformity of illumination of the material in the trays with an accuracy within the range of ±5%. Each light source 46 and 48 may contain, e.g., 300 LEDs. It is understood that this amount is given only as an example and the final result will be defined by the total dose with which the prepolymerizable material is irradiated. The light sources 46 and 48 may be replaceable and operate on the same or different wavelengths.

It is known that different photopolymerizable precursors can react differently to different wavelengths of light radiation. Therefore, as mentioned above, the light sources 46 and 48 may be replaceable and consist of LEDs of different wavelengths. For example, the light sources 46 and 48 may operate on the wavelength of 405 nm or on the wavelength of 440 nm, or one of them may operate on the wavelength of 405 nm and another on the wavelength of 440 nm. It is understood that the specific wavelengths are given only as examples.

The optimal dose for obtaining the final product with optimal parameters acceptable for subsequent use of the obtained prepolymer for mixing with other components used in 3D printing may be reached by adjusting the time of exposure and the power of the illuminators. In other words, the dose D can be expressed by the following formula: $D = W \cdot t_{exp}$, where W is a power to which the prepolymerizable material was exposed and $t_{exp}$ is an exposure time. Thus, the value of D may be adjusted by changing the power W, the exposure time $t_{exp}$, or both.

The curing time of staying of the photopolymerizable material under the light emitters and the intensity of the emitted light power, i.e., the radiation dose, can be adjusted (e.g., within the range of 2 sec to 60 sec) and depends on the material used and the viscosity of the prepolymerized material to receive.

The prepolymerized material obtained after passage through the second exposure station 38b is a gelatinous substance having viscosity in the range of 10,000 to 100,000 cPs (after homogenization). In fact, the material obtained in this stage consists of a gelatinous substance and a liquid. The viscosity is selected to provide flowability of the 3D printing material prepared in a mixture with the obtained prepolymer through pipelines of the 3D printing machine (not shown in the drawings).

The prepolymerized material output station 26 contains a separator 50 into which the prepolymerized product that has passed through the second station 38b falls from the tray when the latter loops over the driven pulley 32. The separator's interior is divided into two sections 50a and 50b by a tiltable sieve 50c, which passes the liquid phase of the prepolymerized material into the section 50b and retains the gelatinous phase in the section 50a. From the section 50a, the gelatinous phase is fed through a funnel 51 into a prepolymerized material receiver. In the illustrated case, the prepolymerized material receiver is shown as a crusher such as a shredder 52. The shredder 52 may be a conventional industrial shredder such as Twin Shaft Wagner Shredder WTS500 (Austria), or the like. The shredder breaks the gelatinous substance into small pieces having dimensions, e.g., in the range of 1-10 mm.

The final shredded prepolymerized product, which is one of the components to be mixed with minerals or other substances needed for 3D printing of buildings or parts of buildings, is unloaded from the system (after adding mineral fillers (not shown)) to a 3D printing machine (not shown) from a final prepolymer receiver 54. At the same time, the liquid phase of the prepolymerized material accumulated in the section 50b may be returned to the prepolymerizable material input station 24 under the action of a pumping unit 56 via a return pipeline 58. The final prepolymer receiver 54 is provided with an online viscometer 60 that measures viscosity of the obtained crushed and homogenized prepolymerized mass prior to unloading thereof. An example of a viscometer is a TT-100 IECEx Viscometer that allows fast and accurate viscosity readings. Brand: AMETEK Brookfield™.

The viscometer 60 is linked to the central processing unit 40 via a feedback line 62. As mentioned above, the central processing unit 40 may control and adjust the speed of rotation of the motor 34 and, hence, the linear speed of the conveyor 22, and the power of the light emitters 38a and 38b, and hence the radiation dose of the photopolymerizable material.

It is understood that the predetermined degree of prepolymerization, which affects the viscosity and other performance properties of the final flowable mass of crushed and homogenized prepolymer, depends on the dose of irradiation of the material during the process of photopolymerization, and that such a dose is defined by the power of light emitted from the prepolymerization stations 38a and 38b. Since, in the system 20, the viscosity of the final product depends on such variables as the exposure time at the first station 38a, the exposure time at the second station, viscosity of the starting material in the container 28, the thickness of the layer of the photopolymerizable material, etc., it would be advantageous to select these parameters experimentally prior to setting the system to a continuous and automatic operation in a steady mode.

Alternatively, the required thickness of the material layer in each tray can be predetermined by calculations based on the Beer-Lambert law, which determines the attenuation of a parallel monochromatic beam of light when it propagates in an absorbing medium.

In other words, since the light emitted from the illuminators of the photopolymerization stations 38a and 38b decreases in the layer depth direction exponentially, knowing the constant of light absorption of the components, it is possible to evaluate a thickness of the layer of the material in the trays.

Prepolymerization Chamber

Further details of prepolymerization chamber 38 and its various components and associated items will now be described with specific reference to FIGS. 3 through 8B. Starting with FIG. 3, an example conveyor and prepolymerization chamber for use with the system of FIG. 1 is illustrated in front perspective view. System 20 can again include a closed-loop conveyor 22 that is run by pulleys 30, 32, to move multiple trays 36a holding material through the system. Prepolymerization chamber 38 can include at two photopolymerization stations 38a and 38b, although a different number of stations may be used in some embodiments. Using multiple prepolymerization stations 38a, 38b can be advantageous, as the system 20 can continue to operate even when the operation of one of the stations is halted, such as due to station failure, maintenance, or the like.

A central processing unit 40 can be located at prepolymerization chamber 38 and may be considered as part of the prepolymerization chamber in some arrangements. Central processing unit 40 can be located between the prepolymerization stations 38a, 38b atop the prepolymerization chamber 38, for example. Central processing unit 40 can have an internal processor (not shown), as well as a display screen 41 and buttons 43 to provide input and output capabilities for system users. Such inputs can include, for example, adjusting the intensity of the light sources, adjusting the times of exposure, adjusting the conveyor speed and timing, and the like. In some embodiments, central processing unit 40 may not directly control the speed or timing of conveyor 22, but rather may include an interface to communicate with another processor that controls conveyor 22. In such arrangements, central processing unit 40 can instruct a separate conveyor processor to adjust operations of the conveyor 22 as needed.

A first prepolymerization station 38a can include a fan 35, ventilation holes 45, a lid 39a, a handle 49a coupled to the lid 39a, and hinges or bearings 47 that facilitate opening of the lid 39a while keeping the lid attached to the prepolymerization chamber 38. Similarly, a second prepolymerization station 38b can also include a fan 35, ventilation holes 45, a lid 39b, a handle 49b coupled to the lid 39b, and hinges or bearings 47 that facilitate opening of the lid 39b while keeping the lid attached to the prepolymerization chamber 38. In various arrangements, prepolymerization chamber 38 can remain stationary while conveyor 22 moves the various trays such as tray 36a from the material loading station through the prepolymerization chamber 38.

The fans 35 and various ventilation holes 45 can facilitate air circulation through the internal regions of the prepolymerization chamber while the material is being irradiated in each of the first prepolymerization station 38a and second prepolymerization station 38b. Again, each prepolymerization station 38a, 38b can have its own internal light source (not shown in FIG. 3) that is used to irradiate the material as it passes therethrough, as noted above. Each internal light source can be an ultraviolet LED array, such as a 30×20 LED array, for example.

One or more temperature sensors (not shown) may be disposed within or internally about one or both prepolymerization stations 38a, 38b. The central processing unit 40 may monitor the internal temperature of the stations 38a, 38b by way of signals from the temperature sensor(s). The central processing unit 40 may independently control the speed of the fans 35 to adjust the amount of airflow drawn into the stations 38a, 38b. The air flow regulates the internal temperature of stations 38a, 38b.

Each prepolymerization station door or lid 39a, 39b can be opened by way of an attached handle 49a, 49b respectively, to provide access to an internal region of the prepolymerization station. This can allow for maintenance or replacement of various dead or malfunctioning LEDs or other light source components, for example. In some arrangements, central processing unit 40 can be configured to detect a system event, such as when a light source is not operating properly or when one or lids 39a, 39b is open, such that the central processing unit can alter operations of the system, as detailed below.

Figure 3:
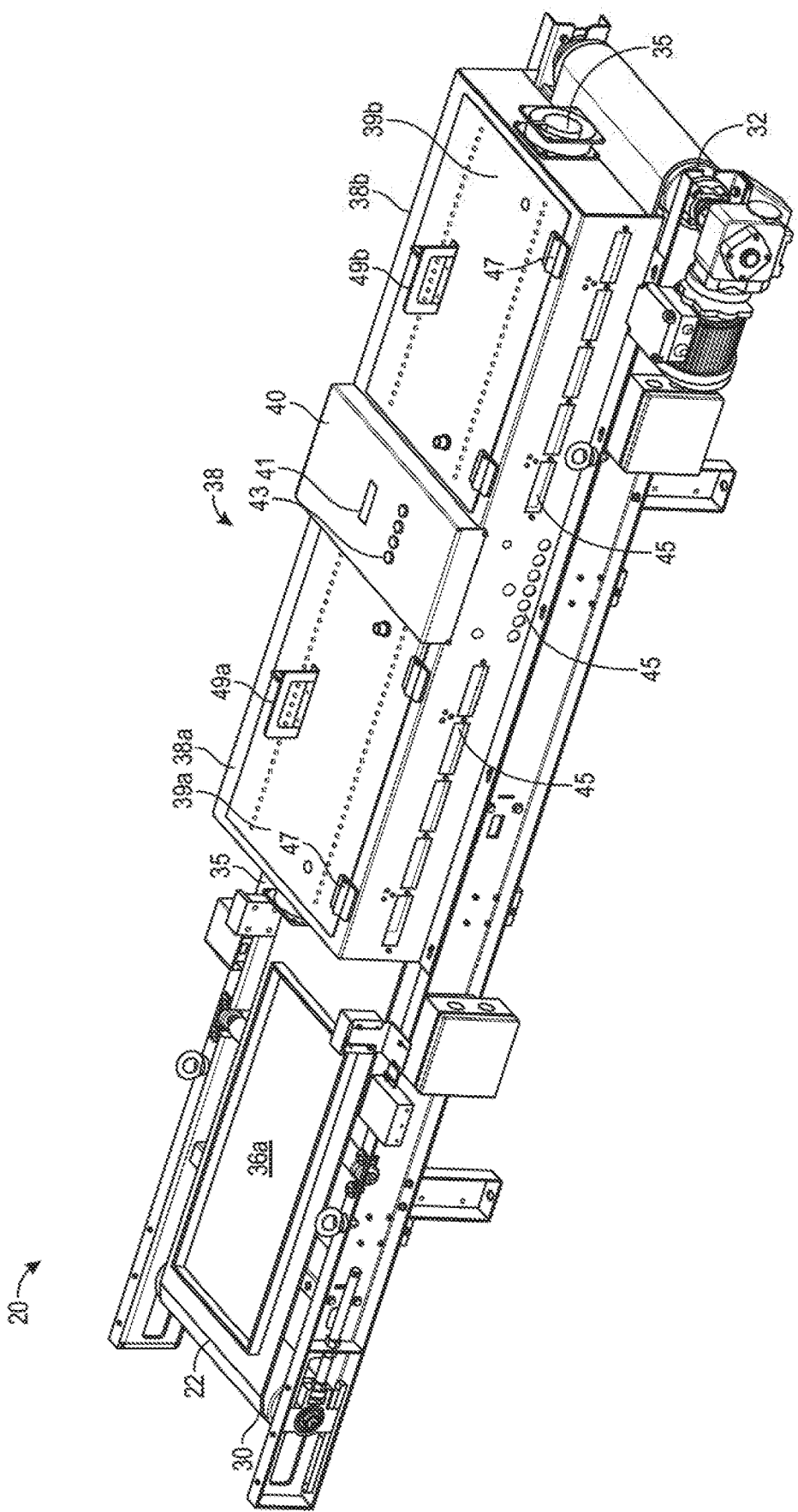
FIG. 3 illustrates in front perspective view an example conveyor and prepolymerization chamber for use with the system of FIG. 1 according to one embodiment of the present disclosure.
Figure 4:
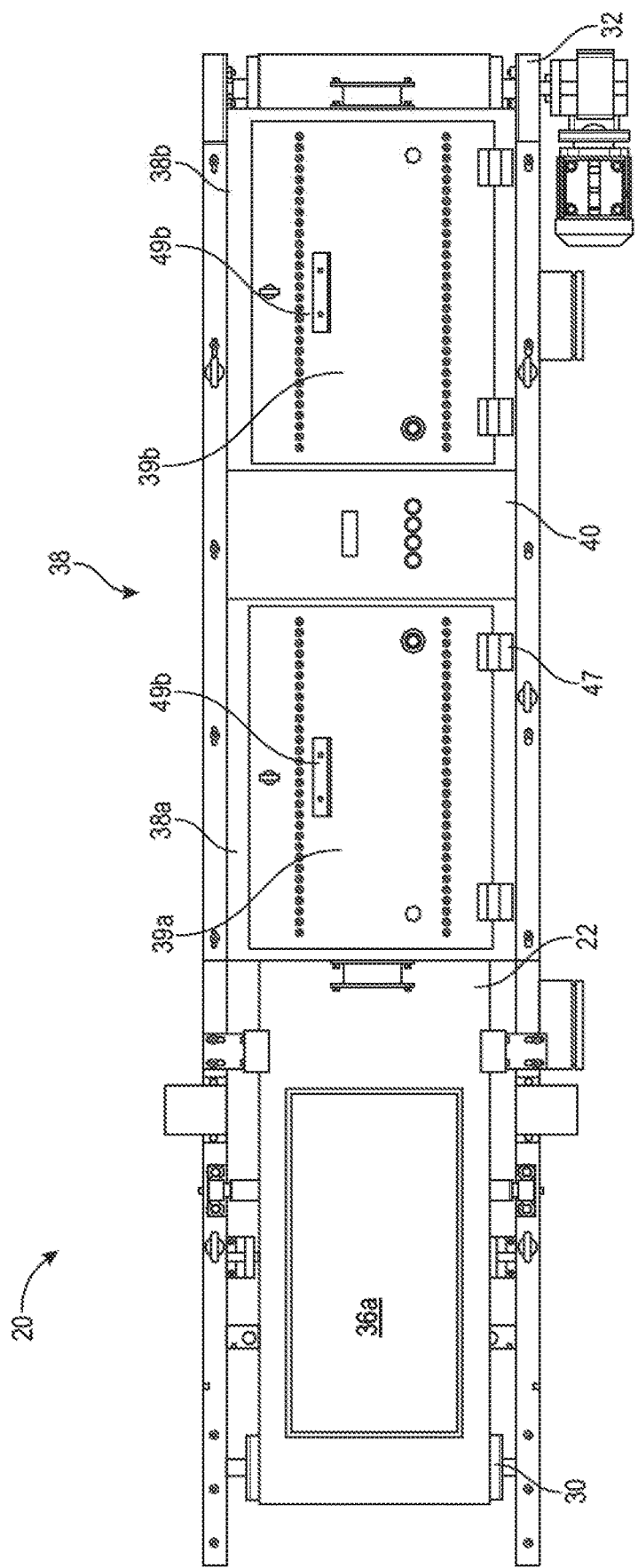
FIG. 4 illustrates in top plan view the conveyor and prepolymerization chamber of FIG. 3 according to one embodiment of the present disclosure.
Figure 5:
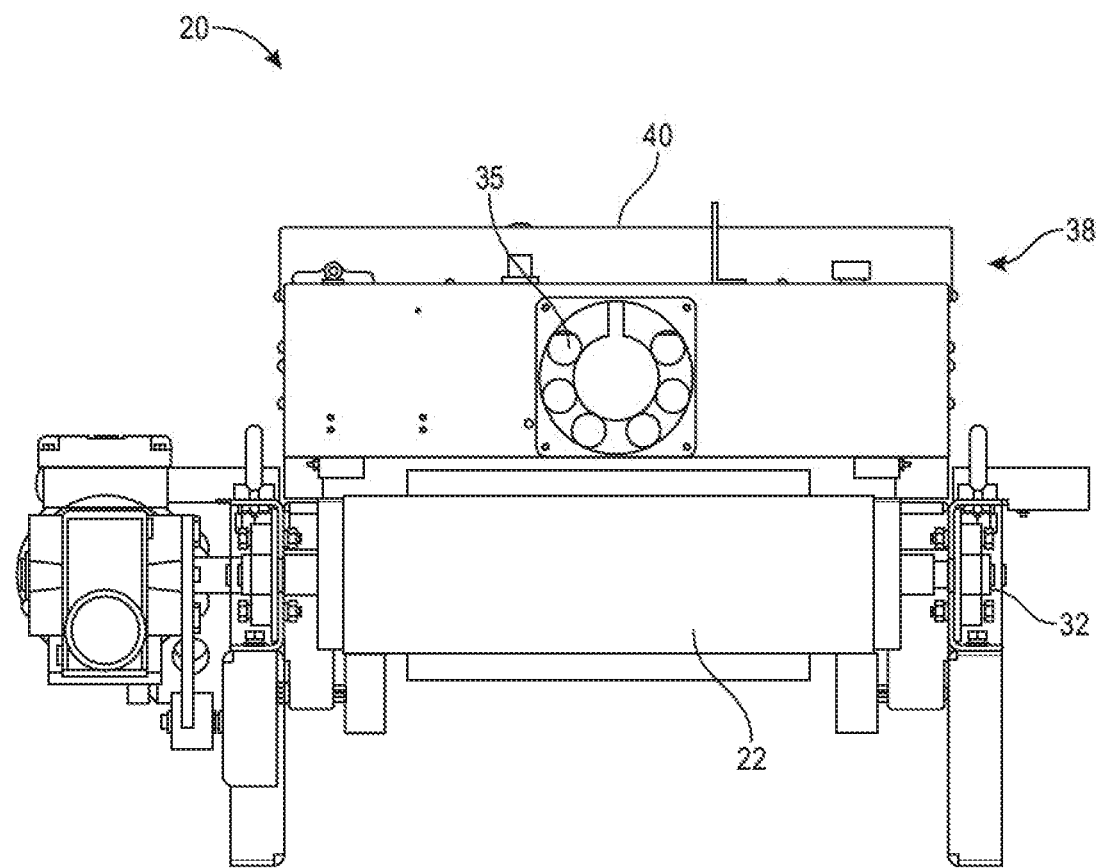
FIG. 5 illustrates in rear end elevation view the conveyor and prepolymerization chamber of FIG. 3 according to one embodiment of the present disclosure.
Figure 6A:
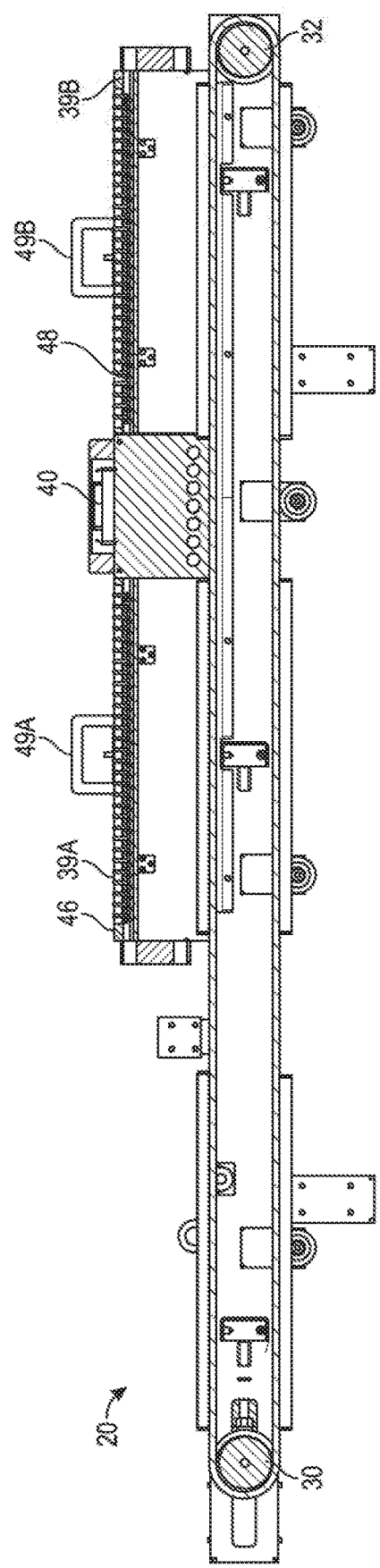
FIG. 6A illustrates in side cross-section view the conveyor and prepolymerization chamber of FIG. 3 according to one embodiment of the present disclosure.
Figure 6B:
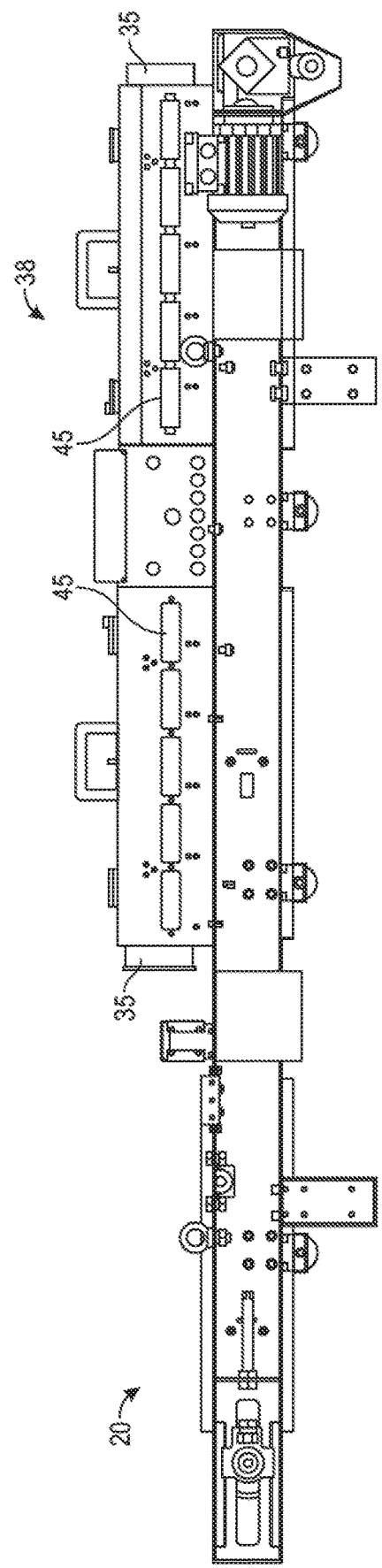
FIG. 6B illustrates in side elevation view the conveyor and prepolymerization chamber of FIG. 3 according to one embodiment of the present disclosure.
Figure 7:
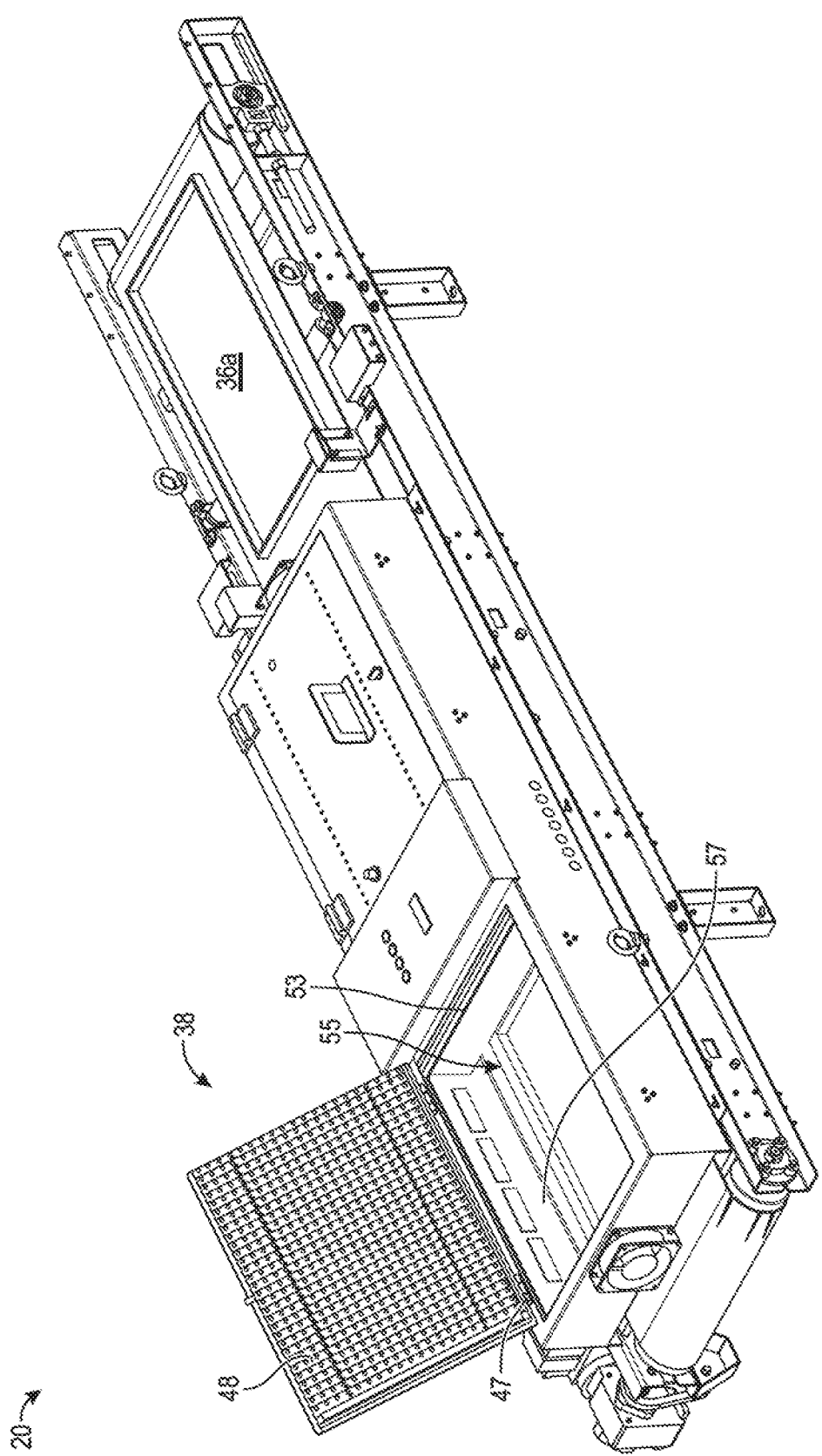
FIG. 7 illustrates in back perspective view the conveyor and prepolymerization chamber of FIG. 3 with one prepolymerization station lid opened according to one embodiment of the present disclosure.

FIGS. 4-7 depict the conveyor and prepolymerization chamber of FIG. 3 in various alternative views for purposes of added illustration. FIG. 4 provides a top plan view, FIG. 5 provides a rear end elevation view, FIG. 6A provides a side cross-section view, FIG. 6B provides a side elevation view, and FIG. 7 provides a back perspective view with one prepolymerization station lid opened.

As shown in FIG. 7, lid 39b of prepolymerization station 38b has been opened about hinges 47 to reveal its internal light source 48. In some arrangements, light source 48 can be fitted within lid 39b such that the light source 48 readily irradiates material passing beneath it inside prepolymerization station 38b when the lid 39b is closed, and such that the light source 48 is readily serviceable when the lid 39b is opened. Light source 46 of prepolymerization station 38*a* can be similarly situation within the lid 39*a* of its prepolymerization station.

The lid 39*b* when closed may rest upon a lip 53 surrounding an opening 55. A clear panel 57 (e.g., a panel made of glass, plexi-glass or other suitable clear material) may be disposed about the opening to prevent polymeric material, dust, and/or other contaminants from adhering to the internal light source 48. The clear panel 57 may be removed to allow cleaning of the surfaces of the panel. The clear panel 57 may have a refractive index of less than 1.5 so as not to impede the ultraviolet radiation emitted from the light source 48. In some arrangements, the clear panel 57 may be translucent yet still capable of passing ultraviolet radiation or other curing light from the light source to polymeric material being treated within prepolymerization station. In some arrangements, an alternative and/or additional clear or translucent panel may be coupled to the underside of lid 39*b*. Identical or substantially similar features such as lip 53, opening 55, and clear panel 57 may also be present within polymerization station 38*a*.

Figure 8A:
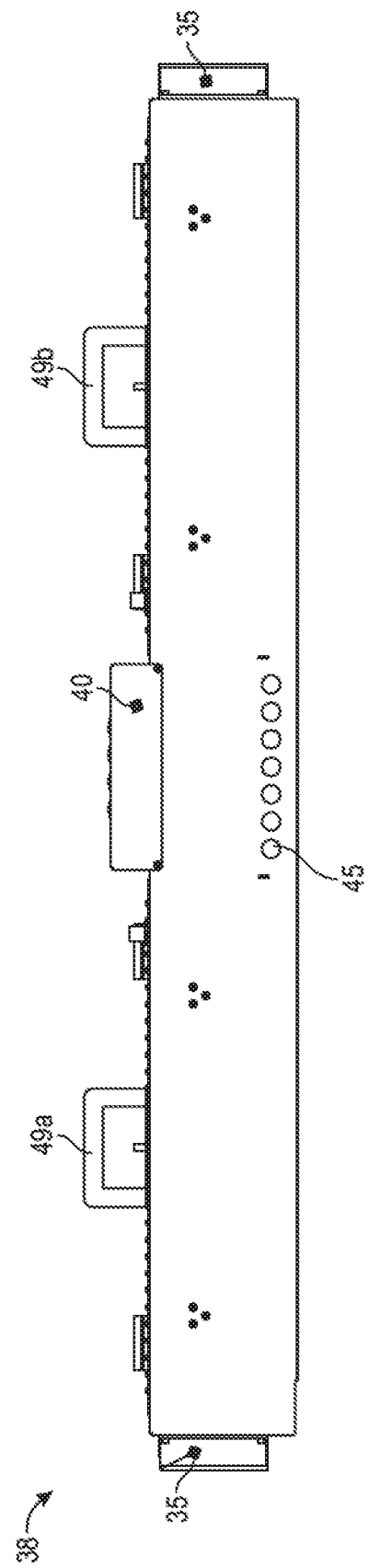
FIG. 8A illustrates in front elevation view an example prepolymerization chamber according to one embodiment of the present disclosure.
Figure 8B:
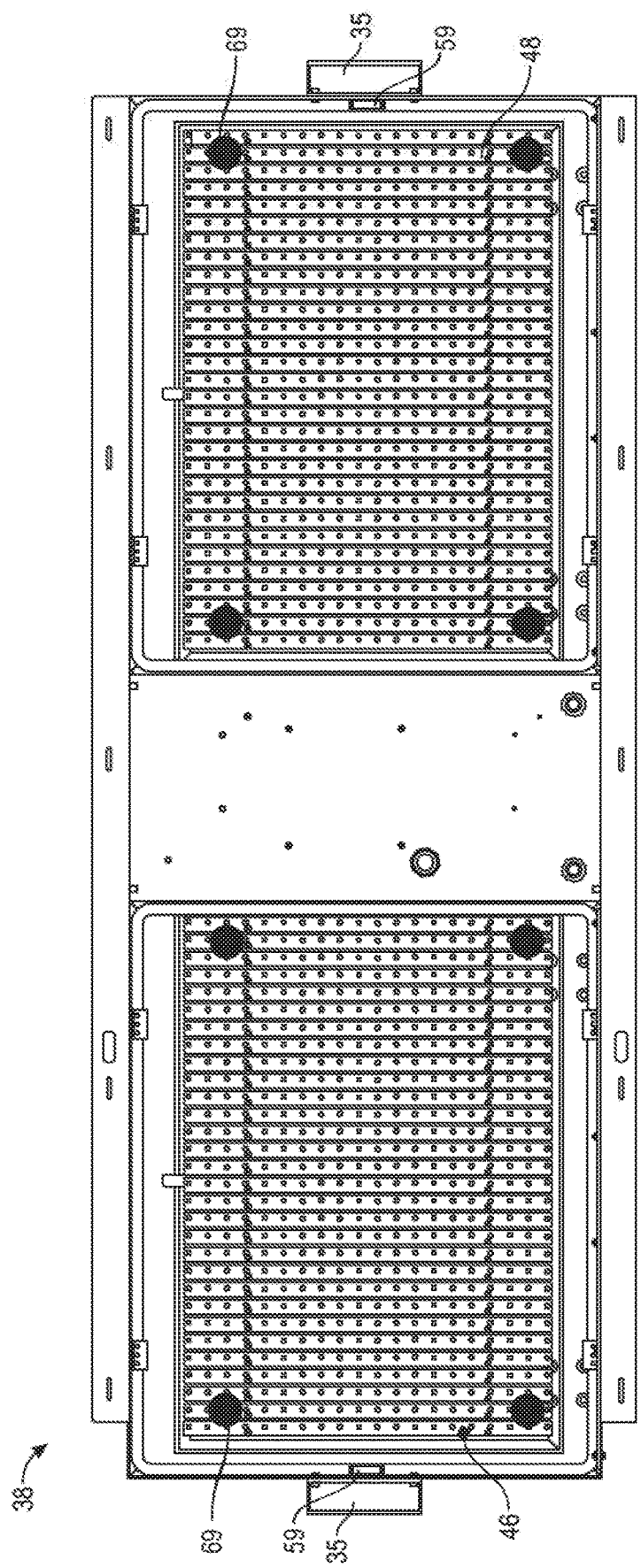
FIG. 8B illustrates in bottom plan view the prepolymerization chamber of FIG. 8A according to one embodiment of the present disclosure.

FIG. 8A illustrates in front elevation view an example prepolymerization chamber, while FIG. 8B illustrates in bottom plan view the same prepolymerization chamber. As shown in FIG. 8B, both light sources 46, 48 of both prepolymerization stations are visible and can be activated to irradiate material as it passes therebeneath. While light sources 46, 48 are shown as having 30×20 LED arrays, it will be understood that other sizes and shapes of arrays may be used, and that other types of light sources may alternatively be used to precure and cure the materials.

Temperature sensors 59 can be located within each of the prepolymerization stations to measure internal temperatures during processing, and these temperature sensors 59 can be coupled to the central processing unit or other processing component for internal temperature monitoring and appropriate system actions. For example, a first temperature sensor 59 can be located proximate the fan 35 within one prepolymerization station, and a second temperature sensor 59 can be located proximate the fan 35 within another prepolymerization station. Temperature readings can be sent from each temperature sensor 59 to the central processing unit or other system processor, and the central processing unit or other processor can adjust the speed of one or more fans accordingly based on the temperature readings to increase or decrease airflow as appropriate through the prepolymerization chamber.

Light intensity sensors 69 can also be located within each of the prepolymerization stations to measure light intensities during processing, and these light intensity sensors 69 can also be coupled to the central processing unit or other processing component for internal light intensity monitoring and appropriate system actions. For example, four light intensity sensors 69 can be located proximate the internal corners of prepolymerization station. Light intensity readings can be sent from each light intensity sensor 69 to the central processing unit or other system processor, and the central processing unit or other processor can adjust the intensity of the relevant LEDs or other light sources accordingly based on the light intensity readings to increase or decrease power to the LEDs as appropriate through each respective prepolymerization chamber.

As noted above, central processing unit 40 can be configured to detect certain system events, such as when a light source 46, 48 is not operating properly, when a prepolymerization station 38*a*, 38*b* is not functioning correctly, when one of the lids 39*a*, 39*b* is open, a manual override input, or any other situation where irradiation is not properly taking place from a light source 46, 48 to underlying material passing therethough. When such a system event is detected, the central processing unit 40 can automatically take action to alter operations of the system such that overall system processing can continue even with a halted operation of one of the prepolymerization stations.

In some arrangements, such action can include increasing the intensity of the light source of the still operable prepolymerization station. In the case of more than two prepolymerization stations, this can include increasing the intensity of some or all of the remaining operable prepolymerization stations. For example, when operation of prepolymerization station 38*a* is halted for any reason, then central processing unit 40 can detect such an event and automatically double the intensity of the light emitted from light source 48 of still operable prepolymerization station 38*b*. In this manner, the overall system 20 can continue to operate and produce photopolymerized prepolymer of a similar quality while the effective operation of prepolymerization station 38*a* remains halted. A similar adjustment can be made when operation of prepolymerization station 38*b* is halted for any reason.

Alternatively, or in addition, the action taken by central processing unit 40 can involve altering the function of the conveyor 22. This may involve sending an instruction to a separate controller for conveyor 22 to achieve the desired alteration in function. Such an altered function can involve, for example, a longer period of time spent with the conveyor not moving while the material is beneath and being irradiated by the functioning light source. Other altered functions of the system may also be possible to achieve the desired result of continuing overall system operations while operation of one of the prepolymerization stations is halted. In various arrangements, central processing unit 40 can also be configured to detect when a previously halted prepolymerization station is back online, such that system operations can be realtered back to normal.

Material Results

Referring again to FIG. 1, the feedstock material 28 that is fed into the input station 24 can be a liquid mixture of components presented in Table 1 below, for example. The viscosity of the material 28 can be in the range of 5 to 15 cPs, and its density can be in the range of 1.0 to 1.2 kg/l.

The produced prepolymerized material is a gelatinous homogeneous substance having viscosity in the range of 10,000 to 100,000 cPs, for example. This material has an improved adhesiveness, resistance to environment, low shrinkage properties, and a short solidification time. A combination of these properties makes it possible to achieve a desired 3D printing result for a time shorter than with the use of conventional prepolymerized material.

TABLE 1

Characteristics of the Starting Photopolymerizable Material used in the System

| | Components and their Designations | | |
|---|---|---|---|
| Parameter | TPO | PEG 4000 | TEGDMA |
| Chemical formula | Phenylbis(2,4,6-trimethylbenzoyl) phosphine oxide | Polyethylene glycol $H(OCH_2CH_2)_n OH$ | Triethylene glycol dimethacrylate $CH_2$=$C(CH_3)COO(CH_2CH_2O)_3 COC(CH_3)$=$CH_2$ |
| CAS # | 162881-26-7 | 25322-68-3 | 109-16-0 |
| State of matter | Solid yellowish powder | Solid white powder | Transparent liquid |
| Content | 0.01 to 1% | 0 to 0.5% | 98.5 to 99.99% |

Figure 9:
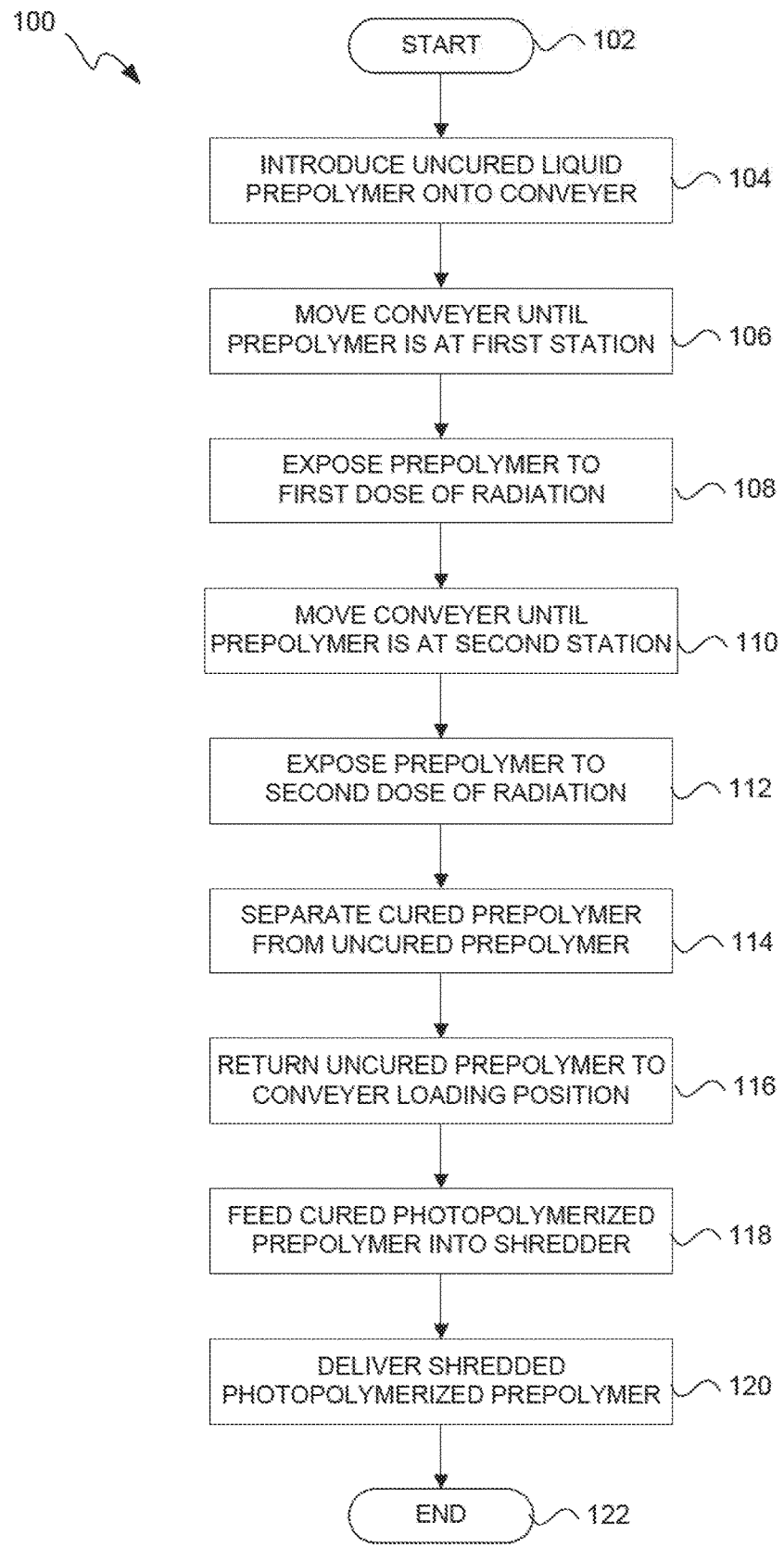
FIG. 9 illustrates a flow diagram of an example method of obtaining photopolymerized prepolymer material according to one embodiment of the present disclosure.

FIG. 9 illustrates a flow diagram of an example method 100 of obtaining photopolymerized prepolymer material according to one embodiment of the present disclosure. After a start step 102, a first process step 104 can involve introducing uncured liquid photopolymerizable material into each movable tray in a predetermined dosed amount controlled through the dosing valve in a manner known in the art. At the filling station, each tray stops by the command sent to the conveyor motor from the central processing unit.

At subsequent process step 106, the conveyor belt can assume its motion after the filling operation is completed and move until the tray is aligned with the position directly under the light source of the first prepolymerization station.

At the next process step 108, the material can be exposed to a predetermined first dose of radiation at the first prepolymerization station. This can provide prepolymerization of the photopolymerizable material to a first desired degree of prepolymerization.

At following process step 110 after precuring on the first station, the conveyor belt can again assume its motion and align the tray that contains the precured material with the light source of the second station.

At subsequent process step 112, the material precured on the stage can then be subjected to a predetermined second dose of radiation for final curing to achieve the desired degree of prepolymerization.

Process steps 104-112 can proceed continuously with the conveyor continuing its way along an endless looped path around the pulleys.

At process step 114, the tray reaches the edge of the conveyor and changes its direction by looping around the pulley, where the tray drops the final gelatinous prepolymerized material to a first section of the separator. The obtained material may contain a liquid uncured phase.

At the next process step 116 in the separator, the liquid uncured phase flows into a second section of the separator and returns to the tank via the pipeline under the action of the pumping unit. In various embodiments, process step 116 can be optional.

At the next process step 118, the separated homogenous prepolymerized material, which is obtained with a preset viscosity of 10,000 to 100,000 cPs and a temperature in the range of 30 to 40° C., is fed from the first section of the separator via a funnel to the crusher or shredder, and from the shredder to the prepolymer receiver, where the viscosity of the prepolymer is controlled by the online viscometer. In various embodiments, process step 118 can be optional.

At process step 120, the final prepolymer is unloaded from the receiver in the direction of the arrow B to the mixer of a 3D printing machine. The method then ends at end step 122.

Application Example 1

A prepolymerizable mixture suitable for photoprepolymerization was prepared from 80 liters of triethylene glycol dimethacrylate ($CH_2$=$C(CH_3)COO(CH_2CH_2O)_3 COC(CH_3)$=$CH_2$ (TEGDMA), 40 g of phenylbis (2,4,6-trimethylbenzoyl)phosphine oxide (TPO—prepolymerization initiator) and 40 g of polyethylene glycol $H(OCH_2CH_2)_n$ OH (PEG). The mixture was filtered for removal of inclusions and poured into a trough 36a via the dosing valve 44. The trough filling time was 50 sec. The filled trough was then sent to the first prepolymerization station 38a. The first prepolymerization station contained 600 LEDs with a maximal light emission energy 5 W, of which only about 90% (4.5 W) was used for irradiation of the prepolymerizable mixture. The irradiation time was 27 sec. The mixture pretreated on the first prepolymerization was transferred to the second prepolymerization station 38b, which contained 600 LEDs with a total light emission energy 5 W, of which only about 90% (4.5 W) was used for irradiation of the prepolymerizable mixture. The irradiation time was 27 sec. Thus, the radiation dose on each station was 4.5 W×27 sec=about 121.5 J, and the total radiation dose was 243 J. The viscosity of the final prepolymerized material, which was unloaded after filtration through the sieve 50c and the shredder 52, was 70,000 cP. Since in this case the viscosity of the final product was within the prescribed range, the product was suitable for use in construction 3D printing.

Comparative Example 1

A prepolymerizable mixture suitable for photoprepolymerization was prepared from 80 liters of triethylene glycol dimethacrylate ($CH_2$=$C(CH_3)COO(CH_2CH_2O)_3 COC(CH_3)$=$CH_2$ (TEGDMA), 40 g of phenylbis (2,4,6-trimethylbenzoyl) phosphine oxide (TPO—prepolymerization initiator) and 40 g of polyethylene glycol $H(OCH_2CH_2)_n$ OH (PEG). The mixture was filtered for removal of remnants of solid PEG 4000 and poured into a trough 36a via the dosing valve 44. The trough filling time was 50 sec. The filled trough was then sent to the first prepolymerization station 38a. The first prepolymerization station contained 600 LEDs with a total light emission energy 5 W, of which only about 90% (4.5 W) was used for irradiation of the prepolymerizable mixture. The irradiation time was 10 sec. The mixture pretreated on the first prepolymerization was transferred to the second prepolymerization station 38b, which contained 600 LEDs with a total light emission energy 5 W, of which only about 90% (4.5 W) was used for irradiation of the prepolymerizable mixture. The irradiation time was 10 sec. Thus, the radiation dose on each station was 4.5 W×10 sec=about 45 J, i.e., and the total radiation dose was 90 J. The viscosity of the final prepolymerized material, which was unloaded after filtration through the sieve 50c and the shredder 52 was 9000 cP. Since in this case the viscosity of the final product was beyond the prescribed range, the product was unsuitable for use in construction 3D printing.

Comparative Example 2

A prepolymerizable mixture suitable for photoprepolymerization was prepared from 80 liters of triethylene glycol dimethacrylate ($CH_2$=$C(CH_3)COO(CH_2CH_2O)_3COC(CH_3)$=$CH_2$ (TEGDMA), 40 g of phenylbis (2,4,6-trimethylbenzoyl)phosphine oxide (TPO—prepolymerization initiator) and 40 g of polyethylene glycol $H(OCH_2CH_2)_nOH$ (PEG). The mixture was filtered for removal of remnants of solid PEG 4000 and poured into a trough 36a via the dosing valve 44. The trough filling time was 50 sec. The filled trough was then sent to the first prepolymerization station 38a. The first prepolymerization station contained 600 LEDs with a total light emission energy 5 W, of which only about 90% (4.5 W) was used for irradiation of the prepolymerizable mixture. The irradiation time was 40 sec. The mixture pretreated on the first prepolymerization was transferred to the second prepolymerization station 38b, which contained 600 LEDs with a total light emission energy 5 W, of which only about 90% (4.5 W) was used for irradiation of the prepolymerizable mixture. The irradiation time was 40 sec. Thus, the radiation dose on each station was 4.5 W×40 sec=about 180 J, and the total radiation dose was 360 J. The viscosity of the final prepolymerized material, which was unloaded after filtration through the sieve 50c and the shredder 52 was 112,000 cP. Since in this case the viscosity of the final product was beyond the prescribed range, the product was unsuitable for use in construction 3D printing.

Thus, it can be seen that selection of an optimal dose of irradiation is a very important factor for prepolymerization of a mixture consisting of TEGDMA, TPO, and PEG prepared in proportions of 80 liters, 40 g, and 40 g, respectively. It is understood that this result was obtained for a prepolymerizable material composed of TEGDMA, PPO, and PEG and for the contents of these components in predetermined proportions.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. For example, light sources other than LEDs and with wavelengths different from those indicated above can be used. Also, trays may have shapes different from those shown in FIG. 2 and are not necessarily flexible. In various embodiments, more than two prepolymerization stations can be used, or alternatively only one prepolymerization station might be sufficient. Furthermore, components of the original photopolymerizable composition may be different from those shown in the table and examples. In addition, a pulsing pump can be used instead of the dosing valve for loading the trays with a dosed amount of the precursor material. Various other changes and modifications may be practiced, and it is understood that the disclosure is not to be limited by the foregoing details, but rather is to be defined by the scope of the appended claims.

What is claimed is:

1. A photopolymerized prepolymer production system, the system comprising:
    a conveyor configured to move material from a loading area to an unloading area;
    a prepolymerization chamber positioned proximate the conveyor, the prepolymerization chamber having:
        a first prepolymerization station located within the prepolymerization chamber, the first prepolymerization station including a first light source configured to irradiate material at a first intensity level as the conveyor moves the material past the first prepolymerization station, wherein the material comprises an untreated liquid material before the separate conveyor moves the material past the first prepolymerization station, and
        a second prepolymerization station located within the prepolymerization chamber proximate the first prepolymerization station, the second prepolymerization station including a second light source configured to irradiate the material at a second intensity level as the conveyor moves the material past the second prepolymerization station, wherein the prepolymerization chamber is configured to convert at least a portion of the untreated liquid material into a photopolymerized prepolymer material with a predetermined degree of prepolymerization that does not convert the material into a fully cured polymerized material, and wherein the prepolymerization chamber is configured to automatically increase the first intensity level when operation of the second prepolymerization station is halted and to automatically increase the second intensity level when operation of the first prepolymerization station is halted; and
    one or more processors configured to control operations of the conveyor, the prepolymerization chamber, or both, wherein the one or more processors are configured to alter operations of the conveyor, the prepolymerization chamber, or both, in response to a detected system event.

2. The system of claim 1, wherein the photopolymerized prepolymer material is suitable for use in the three-dimensional ("3D") printing of buildings or building components.

3. The system of claim 2, wherein suitability of the photopolymerized prepolymer material is determined using a viscometer.

4. The system of claim 3, wherein the system is configured to emit a radiation dose in the range of 100 to 350 J to the untreated material in the prepolymerization chamber.

5. The system of claim 1, wherein each of the multiple prepolymerization stations includes one or more light sources that irradiate the untreated material as the conveyor moves the untreated material past the prepolymerization chamber.

6. The system of claim 5, wherein each of the multiple prepolymerization stations further includes a lid that facilitates access to the one or more light sources.

7. The system of claim 6, wherein each of the one or more light sources is contained within the lid of its respective prepolymerization station, and wherein at least one of the one or more light sources includes an array of light-emitting diodes ("LEDs").

8. The system of claim 1, wherein the detected system event involves a halted operation of one of the multiple prepolymerization stations.

9. The system of claim 8, wherein the one or more processors are configured to measure and increase the intensity of the one or more light sources in the remaining prepolymerization stations in response to the halted operation of one of the multiple prepolymerization stations.

10. The system of claim 1, wherein each of the multiple prepolymerization stations further includes at least one fan and one or more ventilation holes to facilitate air circulation as the conveyor moves the untreated material past the prepolymerization chamber.

11. The system of claim 10, wherein each of the multiple prepolymerization stations further includes one or more temperature sensors to sense temperature and facilitate the control of air flow in the prepolymerization chamber.

12. The system of claim 11, wherein the one or more processors are configured to adjust the speed of the at least one fan in response to temperature sensed by the one or more temperature sensors.

13. A prepolymerization chamber configured to convert an untreated liquid material into photopolymerized prepolymer material, the prepolymerization chamber comprising:
a first prepolymerization station located within the prepolymerization chamber, the first prepolymerization station including a first light source configured to irradiate material at a first intensity level as a separate conveyor moves the material past the first prepolymerization station, wherein the material comprises an untreated liquid material before the separate conveyor moves the material past the first prepolymerization station; and
a second prepolymerization station located within the prepolymerization chamber proximate the first prepolymerization station, the second prepolymerization station including a second light source configured to irradiate the material at a second intensity level as the separate conveyor moves the material past the second prepolymerization station, wherein the prepolymerization chamber is configured to convert at least a portion of the untreated liquid material into a photopolymerized prepolymer material with a predetermined degree of prepolymerization that does not convert the material into a fully cured polymerized material, and wherein the prepolymerization chamber is configured to automatically increase the first intensity level when operation of the second prepolymerization station is halted and to automatically increase the second intensity level when operation of the first prepolymerization station is halted.

14. The prepolymerization chamber of claim 13, further comprising:
a first lid at the first prepolymerization station that facilitates access to the first light source; and
a second lid at the second prepolymerization station that facilitates access to the second light source.

15. The prepolymerization chamber of claim 14, wherein the first light source is contained within the first lid and the second light source is contained within the second lid, and wherein the first light source and the second light source both include an array of LEDs.

16. The prepolymerization chamber of claim 13, further comprising:
at least one processor configured to control operations of the prepolymerization chamber, wherein the at least one processor is configured to automatically increase the first intensity level when operation of the second prepolymerization station is halted and to automatically increase the second intensity level when operation of the first prepolymerization station is halted.

17. The prepolymerization chamber of claim 16, wherein the at least one processor is further configured to interface with a separate processor controlling the separate conveyor, and wherein interfacing includes providing an instruction to the separate processor to slow the speed of the separate conveyor when operation of the first prepolymerization station is halted or operation of the second prepolymerization station is halted.

18. The prepolymerization chamber of claim 13, wherein halted operation of one of the first or second prepolymerization stations while the other prepolymerization station continues operation includes performing maintenance on the halted prepolymerization station.

19. The prepolymerization chamber of claim 16, further comprising:
a first fan at the first prepolymerization station;
a second fan at the second prepolymerization station;
a plurality of ventilation holes at the first and second prepolymerization stations, wherein the first fan, second fan, and plurality of ventilation holes facilitate air circulation as the separate conveyor moves the material past the prepolymerization chamber;
a first temperature sensor at the first prepolymerization station; and
a second temperature sensor at the second prepolymerization station, wherein the at least one processor is configured to adjust the speed of the first fan, the second fan, or both in response to temperature sensed by the first temperature sensor, the second temperature sensor, or both.

20. The prepolymerization chamber of claim 14, wherein both of the first lid and the second lid also facilitate access to the separate conveyor.

21. The prepolymerization chamber of claim 13, wherein the first prepolymerization station and the second prepolymerization station are separate from each other and are arranged within the prepolymerization chamber such that the separate conveyor moves the material to expose the untreated liquid material to a first dose of radiation at the first prepolymerization station and then subsequently moves the material to expose the material to a second dose of radiation at the second prepolymerization station.

22. A prepolymerization chamber configured to convert material into photopolymerized prepolymer material, the prepolymerization chamber comprising:
a first prepolymerization station including a first lid and a first light source configured to irradiate material at a first intensity level as a separate conveyor moves the material past the first prepolymerization station, wherein the first lid facilitates access to both the first light source and the separate conveyor; and
a second prepolymerization station including a second lid and a second light source configured to irradiate the material at a second intensity level as the separate conveyor moves the material past the second prepolymerization station, wherein the prepolymerization chamber is configured to automatically increase the first intensity level when operation of the second prepolymerization station is halted and to automatically increase the second intensity level when operation of the first prepolymerization station is halted.

* * * * *